(12) United States Patent
McGinn et al.

(10) Patent No.: US 7,544,016 B2
(45) Date of Patent: *Jun. 9, 2009

(54) SEDIMENT CONTROL

(75) Inventors: John H. McGinn, Sacramento, CA (US); Vincent P. Morris, Alameda, CA (US)

(73) Assignee: Ertec Environmental Systems LLC, Alameda, CA (US)

( * ) Notice: Subject to any disclaimer, the term of this patent is extended or adjusted under 35 U.S.C. 154(b) by 274 days.

This patent is subject to a terminal disclaimer.

(21) Appl. No.: 11/333,825

(22) Filed: Jan. 17, 2006

(65) Prior Publication Data

US 2006/0171785 A1  Aug. 3, 2006

Related U.S. Application Data

(60) Provisional application No. 60/648,963, filed on Jan. 31, 2005, provisional application No. 60/655,287, filed on Feb. 22, 2005.

(51) Int. Cl.
E02B 3/00 (2006.01)

(52) U.S. Cl. .................. 405/302.6; 405/15; 405/19; 405/32; 210/170.03

(58) Field of Classification Search ............. 405/302.7, 405/302.6, 302.4, 15, 16, 19, 17, 32; 210/170.03, 210/489, 499; 428/357, 372
See application file for complete search history.

(56) References Cited

U.S. PATENT DOCUMENTS

| | | | |
|---|---|---|---|
| 3,112,262 A | 11/1963 | Parkinson | 210/130 |
| 3,455,112 A | 7/1969 | Twele | 61/3 |
| 4,854,773 A | 8/1989 | Nicoll | 405/15 |
| 5,108,224 A | 4/1992 | Cabaniss et al. | 405/52 |
| 5,257,878 A | 11/1993 | Peterson | 405/15 |
| 5,338,131 A | 8/1994 | Bestmann | 405/24 |
| 5,575,584 A | 11/1996 | Alsop | 405/24 |
| 5,632,888 A | 5/1997 | Chinn et al. | 210/164 |
| 5,733,825 A | 3/1998 | Martin et al. | 428/372 |
| 5,954,451 A | 9/1999 | Presby | 405/49 |
| 6,277,473 B1 | 8/2001 | McGinn | 428/188 |
| 6,332,737 B1 | 12/2001 | Mattson | 405/63 |
| 6,422,787 B1 | 7/2002 | Mikell | 405/15 |
| 6,497,532 B1 | 12/2002 | McGinn | 405/27 |

(Continued)

FOREIGN PATENT DOCUMENTS

GB    2171131    8/1986

*Primary Examiner*—Frederick L Lagman
(74) *Attorney, Agent, or Firm*—T. H. P. Richardson

(57) ABSTRACT

Sediment collection devices (SCDs) which can be used to collect sediment from sediment-bearing liquid, for example runoff from construction sites, and which have improved durability, particularly when wheeled vehicles pass over them. The SCDs include a horizontal location member; and a generally vertical member comprising (1) a filter which has relatively small apertures therethrough, and (2) threshold and outflow members each of which have relatively large apertures therethrough and which together provide a sediment control chamber (SCC) between them. The height of the SCC is at least 1.5 times its width; and/or the SCC is shaped so that a vehicle wheel approaching the SCD contacts the SCD at a defined height and angle; and/or one or both of the threshold member and the outflow member has a bending or stiffening line such that different parts of the SCD respond differently to bending forces. Precursors and methods for making such SCDs are described.

20 Claims, 3 Drawing Sheets

U.S. PATENT DOCUMENTS

| | | | |
|---|---|---|---|
| 6,505,996 B1 | 1/2003 | Ianniello et al. | 406/36 |
| 6,547,493 B2 | 4/2003 | Spangler et al. | 405/302.6 |
| 6,551,505 B2 | 4/2003 | Chinn et al. | 210/164 |
| 6,641,335 B1 | 11/2003 | Allard | 405/302.6 |
| 6,733,209 B2 | 5/2004 | Allard | 405/302.6 |
| 6,811,708 B2 | 11/2004 | Shaw et al. | 210/747 |
| 6,848,866 B1 | 2/2005 | McGinn | 405/302.6 |
| 7,008,144 B2 * | 3/2006 | McGinn | 405/302.6 |
| 7,131,787 B2 * | 11/2006 | McGinn | 405/302.7 |
| 7,172,372 B2 * | 2/2007 | McGinn | 405/302.6 |
| 2003/0143026 A1 | 7/2003 | Santha | 405/15 |
| 2006/0133897 A1 * | 6/2006 | Allard et al. | 405/302.7 |

* cited by examiner

SEDIMENT CONTROL

CROSS-REFERENCE TO RELATED APPLICATIONS

This application claims priority from U.S. provisional application No. 60/648,963, filed Jan. 31, 2005, and from U.S. provisional application No. 60/655,287, filed Feb. 22, 2005.

This application is related to U.S. application Ser. No. 10/742,076 filed Dec. 19, 2003, by John McGinn, now U.S. Pat. No. 6,848,866; U.S. application Ser. No. 10/843,010 filed May 11, 2004, by John McGinn, now U.S. Pat. No. 7,008,144; U.S. application Ser. No. 11/127,614, filed May 11, 2005, by John McGinn, now U.S. Pat. No. 7,131,787, claiming priority from U.S. application Ser. No. 60/569,979, filed May 11, 2004, by John McGinn; U.S. application Ser. No. 11/257,739 filed Oct. 25, 2005 by John McGinn, now U.S. Pat. No. 7,172,372; Canadian patent application No. 2,469,683, filed Jun. 3, 2004, by John McGinn; International application No. US 2004/042092, filed Dec. 16, 2004, by John McGinn and Richard Sherratt, claiming priority from U.S. Ser. Nos. 10/843,010 and 10/742,076, and published as WO 2005/060645; and U.S. application Ser. No. 60/696,998 filed Jul. 5, 2005, by John McGinn and Vincent P. Morris. The entire disclosure of each of those applications and patents is incorporated by reference herein for all purposes.

BACKGROUND OF THE INVENTION

This invention relates to the control of sediment. The term "sediment" is used herein to denote solid particulate material, e.g. soil, sand or pebbles, which can become suspended, or which is suspended, in a flowing stream of liquid, and which will settle out of the liquid when the liquid ceases to flow. The term "sediment control device" (often abbreviated herein to SCD) is used herein to denote an article which can be transported and placed (i) on top of a substrate, usually the ground, in order to collect sediment from a sediment-bearing stream of liquid, usually water, which passes through the SCD, or (ii) around an existing land mass composed of, for example, soil, sand, pebbles or rocks, in order to prevent or reduce removal of sediment from the land mass by water flowing towards, along, over or through the land mass. The term "land mass" is used herein to include, but is not limited to, a slope, a gully, a beach, or the bank of a body of water, e.g. a river or lake.

It is often desirable to collect sediment from liquid in which it is suspended, or to stabilize an existing mass of sediment to prevent it from being carried away. In some cases, the law requires removal of sediment from liquid flowing out of a construction site. The conventional method for collecting sediment is to place hay bales or fiber rolls across the path of the liquid. Other methods are described in, for example, the related patent and applications incorporated by reference above (which were published after the priority date of this application) and U.S. Pat. Nos. 6,422,787, 6,547,493 and 6,641,335, the disclosures of which are also incorporated herein by reference.

The earlier related patent and applications referred to in the Cross-Reference section above describe sediment control rolls (SCRs) comprising 1) an elongate threshold member having a multiplicity of relatively large threshold apertures therethrough;
2) an elongate outflow member having a multiplicity of relatively large outflow apertures therethrough;
3) an elongate filter which has a multiplicity of relatively small filter apertures therethrough, and which preferably is supported by the outflow member, and
4) a location member;

the threshold member, outflow member, filter, and location member being secured together so that, when the location member is placed on a horizontal substrate,
   (a) an upright member comprising the threshold member, the filter and the outflow member extends upwards from the substrate, and
   (b) liquid flowing over the location member towards the upright member passes through the threshold member, the filter and the outflow member.

The term "sediment control device (or SCD) which comprises (or comprising) said combination" is used in this specification to denote an SCD comprising, in combination, a threshold member, an outflow member, a filter and a location member as described above. The SCRs described in the earlier related patent and applications contain a substantially hollow elongate sediment control chamber (SCC) which lies between the threshold member and the outflow member, the term "substantially hollow" being defined to mean that the SCC has an unobstructed volume which is at least 50%, e.g. 50 to 98%, of the total volume of the SCR. The term SCD is used in this specification, in preference to the term SCR, because the SCDs of the present invention, although they often contain a substantially hollow SCC as defined in the earlier related patent and applications, do not necessarily contain a substantially hollow SCC.

As noted in the earlier related patent and patent applications referred to above, SCDs are preferably both strong and flexible, so that they will not be rendered ineffective by rough treatment of the kind that is difficult to avoid at construction sites, for example people standing on, and vehicles passing over, the SCD.

SUMMARY OF THE INVENTION

In the development of SCDs comprising said combination, we have discovered, in accordance with the present invention, that factors which influence the durability of SCDs, in particular (but not limited to) SCDs over which wheeled vehicles pass, include
   (1) the shape of the SCC;
   (2) the height at which a wheel (or other object or person) first contacts the SCD;
   (3) the angle between (i) a line joining that point of first contact and the base of the SCD, and (ii) the horizontal, with higher angles being preferred; and
   (4) the resistance to bending of different parts of the SCD, which influences the ease with which the upright member of the SCD can (i) deform in a controlled fashion as a wheeled vehicle passes over the SCD (or another object or a person contacts the SCD), and (ii) subsequently recover towards its original shape after the vehicle (or other object or person) has passed.

The invention provides improved SCDs, improved methods for the production of SCDs, improved precursors for use in the production of SCDs, and improved methods of controlling sediment, which make use of one only of the above factors or a combination of any two or more of the above factors.

In a first preferred aspect, this invention provides an SCD which comprises the said combination and in which the upright member includes an elongate sediment collection chamber (SCC) between the threshold member and the outflow member, the SCC having (i) a cross-section whose height is at least 1.5 times its maximum width, and (ii) an unobstructed volume which is at least 5%, generally at least 10%, e.g. at least 20%, of the total volume of the SCD. The SCC can optionally be "substantially hollow", as that term is used in the related patent and applications referenced above, i.e. the SCC can have an unobstructed volume which is at least 50%, e.g. 50 to 98%, of the total volume of the SCD, or can have, for example, an unobstructed volume which is 20 to 50% of total volume of the SCD.

In a second preferred aspect, this invention provides an SCD which comprises the said combination and in which the SCD has at least one, and preferably both, of the following characteristics (a) the shape of the outflow member is such that, if (i) the location member is placed on a horizontal substrate, (ii) the upright member is, if necessary, bent so that its highest point is vertically above the point at which the outflow member contacts the substrate, and (iii) a vertical disk having an outer diameter of 28 inches is rolled over the substrate towards the outflow member and at right angles thereto, without passing over the location member,
  (a1) the first point of contact between the disk and the outflow member is at a height of at least 5 in., preferably at least 6 in., e.g. 5-12, or 6-10, in., above the substrate, and
  (a2) the angle between (i) the horizontal and (ii) a line joining said first point of contact and the closest point of contact between the outflow member and the substrate, is at least 65°, preferably at least 70° or at least 77°, e.g. 75-85° or 82-90°; and
(b) the shape of the threshold member is such that, if (i) the location member is placed on a horizontal substrate, (ii) the upright member is, if necessary, bent so that its highest point is vertically above the point at which the outflow member contacts the substrate, and (iii) a vertical disk having an outer diameter of 28 inches is rolled over the location member towards the threshold member and at right angles thereto,
  (b1) the first point of contact between the disk and the threshold member is at a height of at least 5 in., preferably at least 6 in., e.g. 5-12, or 6-10, in., above the substrate, and
  (b2) the angle between (i) the horizontal and (ii) a line joining said first point of contact and the closest point of contact between the threshold member and the location member, is at least 65°, preferably at least 70° or at least 77°, e.g. 75-85° or 82-90°.

In a third preferred aspect, this invention provides an SCD which comprises the said combination and in which the threshold member or the outflow member or each of the threshold and outflow members includes a response line. The term "response line" is used herein to denote a long thin area which is either more or less responsive to bending forces than the areas adjacent to the response line. The response line can be easier to bend (described herein as a "bending line") or more difficult to bend (described herein as a "stiffening line").

In a fourth preferred aspect, this invention provides an SCD which comprises the said combination and in which the base of the threshold member has a reentrant cross-section formed by (i) a first portion which extends upwards away from the location member, (ii) a second portion which extends over the location member, and (iii) a reentrant angle between the first and second portions.

In a fifth preferred aspect, this invention provides a method of making a sediment control device (SCD), preferably but not necessarily an SCD according to the first, second, third or fourth preferred aspect of the invention, the method comprising (A) providing a precursor which comprises an apertured polymeric sheet material which
  (i) has relatively large apertures therethrough,
  (ii) has first and second surfaces, and
  (iii) has a first configuration;
(B) heating a selected area of the sheet so that polymeric material in the selected area is at a temperature above its softening point;
(C) while the polymeric material in the selected area is above its softening point, bending the selected area so that the precursor has a second configuration;
(D) allowing the heated polymeric material to cool while the precursor is in a third configuration, the third configuration being different from the first configuration and being the same as or different from the second configuration;
(E) after step (D), bending the precursor so that it undergoes elastic deformation into a fourth configuration in which selected parts of the precursor are in contact with each other; and
(F) securing the selected parts to each other.

in a sixth preferred aspect, this invention provides a precursor for an SCD which comprises
  (a) an apertured polymeric sheet which
    (i) has relatively large apertures therethrough, and
    (ii) has first and second surfaces; and
  (b) a sheet of filter material secured to the first surface of the apertured polymeric sheet;

the apertured polymeric sheet including a bending line, preferably an elongate bending line, in which the maximum thickness is at most 0.8 times, preferably at most 0.6 times, the maximum thickness of the remainder of the member.

In a seventh preferred aspect, this invention provides a method of controlling sediment in which sediment-containing liquid passes through an SCD according to one or more of the first, second, third and fourth preferred aspects of the invention, an SCD made by the fifth preferred aspect of the invention, or an SCD made from a precursor according to the sixth preferred aspect of the invention

BRIEF DESCRIPTION OF THE DRAWINGS

The invention is illustrated in the accompanying drawings, in which.

Figure 1:
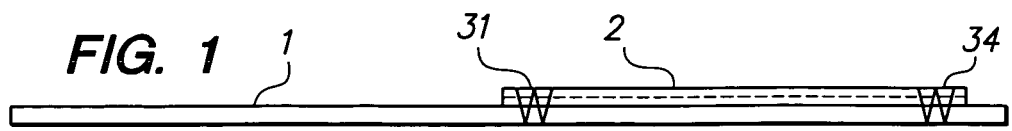
FIGS. 1-5 shows successive stages in the production of an SCD of the invention.

The Figures are diagrammatic and not to scale; in particular the thicknesses of the various members are exaggerated in the interests of clarity.

DETAILED DESCRIPTION OF THE INVENTION

In the Summary of the Invention above, the Detailed Description of the Invention, and the claims below, and in the accompanying drawings, reference is made to particular features of the invention, including for example components, devices, apparatus and methods. It is to be understood that the disclosure of the invention in this specification includes all possible combinations of such particular features. For example, where a particular feature is disclosed in the context of a particular embodiment, a particular Figure or a particular claim, that feature can also be used, to the extent possible, in the context of other particular embodiments, Figures and claims, and in the invention generally. The invention disclosed and claimed herein includes embodiments not specifically described herein and can for example make use of features which are not specifically described herein but which provide functions which are the same, equivalent or similar to, features specifically disclosed herein.

The term "comprises" and grammatical equivalents thereof are used herein to mean that other features are optionally present. For example, an SCD "comprising" (or "which comprises") components A, B and C can contain only components A, B and C, or can contain not only components A, B and C but also one or more other components. Where reference is made herein to a method comprising two or more defined steps, then, unless the context requires otherwise, the defined steps can be carried out in any order or simultaneously, and the method can optionally the include one or more other steps which are carried out before any of the defined steps, between two of the defined steps, or after all the defined steps. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example, "0.5-3" means a range whose lower limit is 0.5, and whose upper limit is 3. The numbers given herein should be construed with the latitude appropriate to their context and expression. The terms "plural" and "plurality" are used herein to mean two or more. When reference is made herein to "a", "an", "one" or "the" feature, it is to be understood that, unless the context requires otherwise, there can optionally be one or more than one such feature.

Where reference is made herein to two or more components (or parts or portions etc.), it is to be understood that the components can optionally be, unless the context requires otherwise, separate from each other or integral parts of a single structure or a single component acting as the two or more specified components.

The First Aspect of the Invention

In the first aspect of the invention, the upright member includes a hollow, elongate sediment control chamber (SCC) whose height is p times its maximum width (i.e. its width at its widest point), where p is at least 1.5, e.g. at least 1.75, and can be substantially more, e.g. as high as 10 or 20. In some embodiments, p is 2-4. In other embodiments, p is 4-15, e.g. 7-14. The height of the upright member can be for example 4-15 inches, preferably 7-10 inches.

The SCC can be of any shape, and can include components in addition to the outflow and threshold members and the filter. In some embodiments, the SCC has a cross-section in which the threshold and outflow members are substantially mirror images of each other, e.g. an oval, egg-shaped, oblate or generally rectangular cross-section. In another embodiment, the SCC has a generally rectangular shape, with top and bottom generally horizontal members joining generally vertical threshold and outflow members. In other embodiments, the threshold and outflow members are not mirror images of each other, e.g. both are convex (viewed from the outside) but of different shapes, or one is straight and the other is convex (viewed from the outside), or both are straight, as for example in a rectangular cross-section. In other embodiments, the outflow member is convex (viewed from the outside) or straight, and the threshold member is generally convex but includes a concave section at or near its base, for example as in the fourth aspect of the invention. In another embodiment, the threshold and outflow members both have a generally shallow convex shape (viewed from the outside), meet at the top of the vertical member, forming a sharply convex section, and are either (i) separated at the base of the vertical member by a short horizontal section, e.g. having a width of less than 0.5 inch, e.g. about 0.25 inch, or (ii) meets at the base of the vertical member. In this embodiment, the threshold member preferably has a sharply concave section at its base and extends over the top of the location member.

The Second Aspect of the Invention

The second aspect of the invention is concerned with the angular conditions when a wheeled vehicle first strikes the outflow member or threshold member (depending on the direction of the vehicle). It will of course be understood that vehicle wheels vary in diameter, and that vehicles will not necessarily cross the SCD at right angles to the axis of the SCD. However, the definitions in the second aspect of the invention (in which the 28 in. diameter disk may be regarded as representing an average wheel) have been found to result in improved performance under practical conditions. It is to be noted that in order to determine whether an SCD fulfills the defined requirements, the upright member (comprising the outflow and threshold members) must be in a configuration such that its highest point is vertically above the point at which the outflow member contacts the horizontal substrate. Depending on the way in which it was made and/or stored, an SCD may have, prior to installation, a configuration in which the upright member is relatively flat. However, the SCD should be installed so that the upright member is generally vertical, so that it functions efficiently.

SCDs having a cylindrical upright member cannot meet the defined requirements of second aspect of the invention. As the ratio of the height of the upright member to its maximum width increases, it becomes more likely that one or both of the defined requirements will be met. As noted above the SCDs of this invention do not necessarily contain a substantially hollow SCC, and SCDs in which there is little or no space between the threshold and outflow members will meet the defined requirements if the upright member is at least 5 in. high.

The Third Aspect of the Invention

The third aspect of the invention is directed to SCDs in which one or both of the threshold and outflow members contains at least one response line as defined above. The response line can for example be such that, during preparation of the SCD, one or both of the threshold and outflow members acquires and retains a desired shape. Alternatively or additionally, a response line can be such that deformation of the SCD, when a wheeled vehicle passes over the SCD, takes place in a desired way. Generally, the response line is an elongate straight line which extends from one end of the SCD to the other.

A bending line can for example have a reduced thickness, e.g. a minimum thickness which is at most 0.8 times, preferably at most 0.6 times, e.g. 0.3 to 0.8 times or 0.4 to 0.7 times, the thickness of the adjacent portion of the member. The bending line can for example have a width of 0.08 to 0.75 in., preferably. 0.12 to 0.35 in., e.g. about 0.25 in.

In the apertured polymeric sheet preferably used for the threshold and outflow members, a response line can be produced by heating the sheet (continuously or at frequent intervals) to soften the polymeric material along a selected line, and then subjecting the heated polymeric material to a further step which alters the response of the sheet to bending forces. One example of such a further step is bending the sheet along the heated line, while the polymeric material is still soft, and allowing polymeric material to cool while the sheet is in a new configuration. In another example, a stiffening line is produced by welding the heated polymeric material to another layer of polymeric material, e.g. to filter material or to another piece of apertured or non-apertured polymeric material. The welding, which need not be continuous, can for example be over a width of 0.3 to 2 in., e.g. 0.4 to 1 in. In another example, a bending line is produced by applying a heated bar, e.g. a metal bar, so that the polymeric material beneath the bar is melted. If desired, the sheet can then be bent, while the polymeric material is still soft, along the heated line, and maintained in a new configuration while the polymeric material cools. For example, heat is supplied along a line of a sheet of apertured material which will provide the threshold and outflow member, and is then vented and pinched along the heated line to provide a sharply convex area which is (or which later becomes) the top of the upright member. The heat can for example be applied while the sheet is flat or at a later stage in manufacture when the sheet has been bent into a generally cylindrical shape. In another example, one or both of the threshold and outflow members is passed between a pair of unheated rollers under conditions such that the member undergoes plastic deformation and a permanent crease is produced.

In a preferred embodiment, each of the threshold and outflow members has a bending line near its base, with the distance between the two bending lines preferably being 0 to 4 in., particularly less than 1 inch or less than 0.5 inch, e.g. about 0.25 inch. The upright member can then deform more easily when a wheeled vehicle passes over the SCD, and recover more easily after the wheeled vehicle has passed.

The Fourth Aspect of the Invention

The fourth aspect of the invention makes use of a threshold member whose base has a reentrant cross-section (i.e. is sharply concave, viewed from the outside,) formed by (i) a first portion which extends upwards away from the location member, (ii) a second portion which extends towards the location member, and (iii) a reentrant angle between the first and second portions. The reentrant cross-section can deform more easily (especially if it contains a bending line). Preferably the second portion extends over, and forms part of, the location member. Preferably the second portion is secured to the rest of the location member along a line which is spaced-apart from the reentrant angle, e.g. by 0.5 to 2 in. This helps to permit relative movement of the threshold member and the location member to accommodate deformation of threshold member when wheeled vehicles pass over the SCD.

The Fifth Aspect of the Invention

The fifth aspect of the invention is directed to a method which makes use of the steps described above to produce a bending line in a precursor (and which remains in an SCD produced from the precursor).

The Sixth Aspect of the Invention

The sixth aspect of the invention is directed to precursors which can for example be used in the method of the fifth aspect of the invention, as well as in other methods for producing SCDs.

The Seventh Aspect of the Invention

The seventh aspect of the invention is directed to methods of controlling a sediment in which sediment-containing liquid is passed through an SCD as described above and/or made by the method described a, and/or made from a precursor as described above. Preferably, the sediment-containing liquid is run-off from a construction site.

The threshold, outflow and filter members used in this invention can be composed of the same materials as those disclosed in the related international application. When two or more SCDs are positioned in line, they can be joined together in any convenient way, optionally by the methods disclosed in that International Application. The SCDs of this invention can be used, but are not in general particularly suited for use, in assemblies of SCDs which are joined together side-by-side and used with their axes generally vertical to stabilize existing land masses.

Preferably, the threshold and outflow members are provided by a single piece of an apertured polymeric sheet which has been shaped into the desired configuration. The single piece preferably also provides all or part of the location member. The filter preferably extends over all or part of the location member, and can for example be sandwiched between overlapping layers of the apertured polymeric sheet.

The apertures in the threshold member (the "relatively large threshold apertures") have a relatively large size such that at least a large proportion, preferably all, of the sediment can pass through the threshold member, and preferably such that the speed of liquid directed at the threshold member is substantially reduced. The threshold member is preferably the first part of the SCR which opposes the flow of the sediment-bearing liquid. Often all the apertures have the same size and/or shape, though this is not necessary. The apertures can be of any shape, for example polygonal, including triangular and parallelogrammatic (including rectangular, e.g. square), round or oval. In some embodiments, each of the apertures is in the shape of a parallelogram in which the acute angles are from 60 to 82°, preferably 70 to 80°. Each of the apertures can for example have an area of 0.01 to 1.0, preferably 0.02 to 0.25, particularly 0.03 to 0.16, e.g. 0.04 to 0.1, in$^2$ (6.5 to 650, preferably is 13 to 160, particularly in 19 to 100, e.g. 25 to 65, mm$^2$), and/or a minimum dimension of 0.1 to 1.0, preferably 0.15 to 0.5, particularly 0.15 to 0.4, e.g. 0.2 to 0.3, in the (2.5 to 25, preferably 3.8 to 13, particularly 3.8 to 10, e.g. 5 to 7.5, mm). Such apertures provide little or no resistance to many of the sedimentary particles generally encountered in practice, but prevent the passage of larger objects floating on the liquid, for example sticks, cans and plastic bottles. In some embodiments of the invention, the solid surface area of the threshold member is 10 to 80%, for example 25 to 65%, of the total area of the exposed surface of the threshold member, both areas being viewed at right angles to the threshold member.

The threshold member can be composed of a multiplicity of strands, e.g. polymeric strands, connected together at junction points, thus providing a solid network, against and through which the sediment-bearing liquid flows. The thickness of the polymeric strands, viewed at right angles to the plane of the threshold member, can for example be 0.08 to 0.3 inch (2 to 7.5 mm), e.g. 0.1 to 0.2 inch (2.5 to 5 mm). Thus, materials suitable for use as the threshold member can be in the form of the heavier grades of netting obtained by melt-extruding an organic polymer. Methods for producing such netting are well-known. Especially when preparation of the SCD includes rolling, or otherwise shaping, a length of such netting to provide the threshold member and the outflow member, the acute angle between the first and second strands is preferably 60 to 82°, for example 70 to 80°. Preparation of such netting requires modification of the well-known techniques for preparing extruded netting, but those skilled in the art will have no difficulty, having regard to their own knowledge and the disclosure of this specification, in preparing such netting.

The threshold member is preferably composed of a polymeric composition (i.e. a composition containing a polymer and conventional additives such as fillers) which can be melt shaped, particularly a composition which does not absorb substantial amounts of water in use and/or which can be recycled and/or which is resistant to ultraviolet light, e.g. through the inclusion of 2-3% by weight of carbon black. Suitable polymers for the composition include polyolefins, particularly high density polyethylene and polypropylene. Other materials that can be used for the threshold member are suitably apertured metal sheets, and interconnected metal wires, optionally coated with synthetic polymers.

The description above of threshold members is also applicable to outflow members. In many cases, the outflow and threshold members are provided by a single piece of suitable apertured material which is cut and shaped to provide the desired relationship between the two members and the rest of the SCD. However, the outflow and threshold members can be separate pieces of the same apertured material, or separate pieces of different apertured materials.

If it is desirable to recycle the SCD, the outflow member is preferably composed of a material which is the same as the threshold member and the filter(s), or which can be recycled in the same batch as the threshold member and filter(s).

The threshold and outflow members are preferably composed of materials, and have dimensions, such that the SCD has adequate strength, toughness and flexibility, without the need for additional support members. High density polyethylene offers a good balance between strength, flexibility, toughness, stability, cost, availability, ease of recyclability, and environmental acceptability. Other satisfactory polymers include polypropylene and low density polyethylene.

The SCD preferably includes a filter supported by, e.g. secured to the inside of, the outflow member (an outflow filter). Alternatively or additionally, the SCD includes a filter which is supported by, e.g. secured to the inside of, the threshold member (a threshold filter). The filter(s) can be secured to the outflow member and/or to the threshold member in any convenient way, for example (a) by an adhesive (e.g. a thermal setting adhesive or a hot melt adhesive) or by melt bonding, and/or (b) by being sandwiched between the outflow or threshold member and an interior layer of the same or similar material having relatively large apertures therethrough. Alternatively, the filter(s) can for example be secured to additional members between the threshold and outflow members.

If the characteristics of the sediment-containing liquid can be predicted, then the characteristics, including but not limited to the mesh size, of the outflow filter (and of the threshold filter if present) can be selected accordingly. In general, the filter layer(s) have a mesh size (measured by ASTM E-11) of 80 to 600 micron, preferably 100 to 500 micron, e.g. about 100 micron. Such filters are commercially available. The filter material can for example be sheet material having a substantially uniform thickness of less than 0.5 in. (12.5 mm) or less than 0.25 in. (6 mm), for example 0.01-0.06 inch (0.25-1.5 mm), preferably 0.01-0.05 inch (0.25-1.3 mm.), e.g. 0.015-0.045 inch (0.4-1.2 mm).

When there is both an outflow filter and a threshold filter, they may be composed of the same or different filter materials. For example, the size of the apertures in the outflow filter can be smaller than the size of the apertures in the threshold filter.

The outflow filter can extend over substantially all of the outflow member. However, in some embodiments, the outflow filter extends over only a lower section of the outflow member, the lower section extending for example from the bottom of the outflow member to an upper level which is at least 50%, e.g. 50 to 90%, preferably at least 70%, e.g. 70 to 90%, of the height of the SCR.

The threshold filter, if present, can extend over substantially all of the threshold member, or can extend over only a lower section of the threshold member, the lower section extending from the bottom of the threshold member to an upper level which is at least 20%, e.g. 20 to 90%, or at least 35%, e.g. 35 to 80%, or at least 60%, e.g. 60 to 90%, of the height of the SCR. The top of the threshold filter, if present, may be at a lower level than the top of the outflow filter. For example, the top of the outflow filter maybe higher by at least 10%, preferably by at least 30%, of the height of the SCC. In another embodiment, there is a section at the top of the SCR which is free from filter material.

The filter(s) is(are) preferably composed of a synthetic polymer, particularly a polymer which does not absorb substantial amounts of water in use and/or which can be recycled. Suitable polymers include polyolefins, particularly high density polyethylene and polypropylene. If it is desirable to recycle the SCR, the filter is preferably composed of a polymer which can be recycled in the same batch as the threshold and outflow members, and which is preferably the same as the polymer in the threshold and outflow members.

It is preferred that all the parts of the SCD are constructed so that the roll does not absorb substantial quantities of water. For example, it is preferred that the roll, when subjected to a test which consists of
 (i) completely immersing the roll in water for 0.5 hour,
 (ii) removing the roll from the water,
 (iii) placing the roll on a horizontal apertured surface, and
 (iv) leaving the roll to drain for 0.5 hour in still air at 20° C, has a weight after the test which is not more than 1.3 times, preferably not more than 1.1 times, its weight before the test.

The dry weight of the SCD is preferably such that it can readily be transported and placed in position manually. The weight may be for example 0.2 to 2.5, e.g. 0.35 to 1.0, lb per linear foot of SCR (0.3 to 3.7, e.g. 0.5 to 1.5 kg/m), with a total weight of for example 1 to 15 lb. (0.45 to 7 kg), preferably less than 8 lb (3.5 kg).

Especially when the SCR is to be placed on a hard surface (e.g. concrete or asphalt), the location member may include a filter member which provides at least part of the bottom surface of the location member and which helps to maintain the location member in contact with the underlying surface. Such a filter can for example be as defined above for the outflow filter.

The location member can include one or more weights, for example around the periphery of the location member, and/or one or more weights, e.g. sandbags, can be placed on the location member after the SCD has been put in place. This helps to secure the SCD in place, and is especially useful when the SCD is being used to control the flow of sediment-bearing liquid into a drain.

An SCD can be used to control the entry of debris and sediment into drains, particularly roadside drains to which there is access through an opening in the curb and which have a rear portion which is unobstructed at the road level but is covered by the sidewalk. The drain may also have an exposed front portion set in the roadway and covered by a heavy grate. The SCD is placed over the opening in the curb. Preferably, the SCD is long enough to be supported by the curb at each end. The height of the upright member of the SCD may be such that it is supported by the sidewalk. If the SCR substantially covers the opening in the curb, the top section of the SCR is preferably free of filter material, so that, if necessary, excess sediment-bearing liquid can flow relatively unimpeded into the drain. The location member extends into the roadway, and if there is a grate in the roadway, over the grate. When the location member extends over the grate, it is longer than is required for other uses, for example 3 to 6 times the height of the upright member. For this use, the location member preferably comprises two overlapping layers of apertured polymeric sheet material having relatively large apertures therein, and, sandwiched between the overlapping layers, a layer of filter material having relatively small apertures therein.

The Drawings

Figure 2:
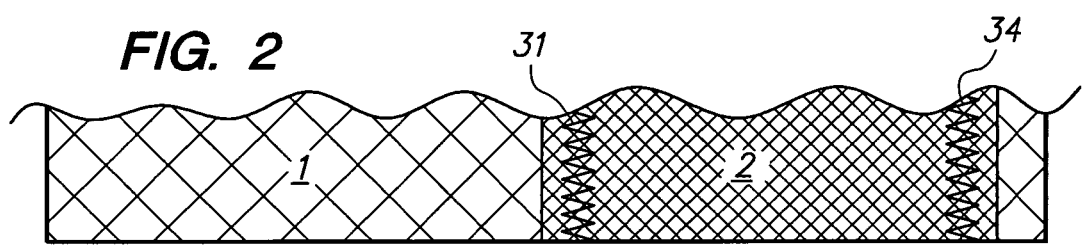
Figure 3:
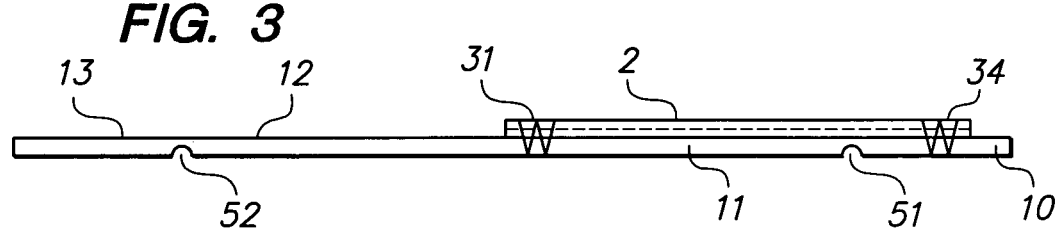
Figure 4:
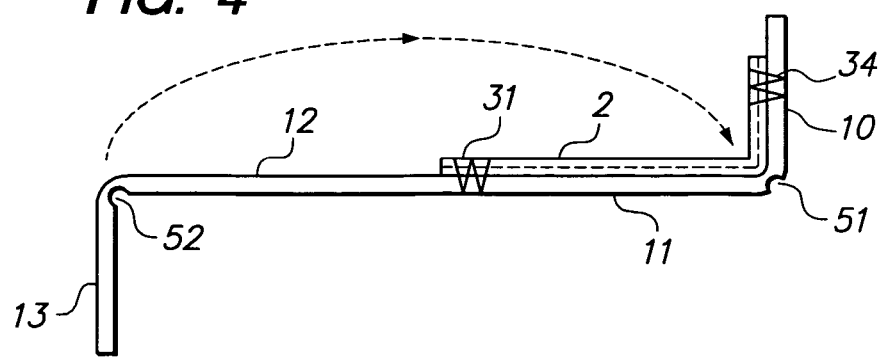

FIGS. 1 and 2 are side and top views of a precursor for an SCD. Polymeric filter material 2 having small apertures is melt-bonded to polymeric netting material 1 along lines 31 and 34. FIG. 3 shows the precursor after a heated metal bar has been used to form bending lines 51 and 52 in the surface of the netting material remote from the filter material, thus defining, in the netting material, portions 10, 11, 12 and 13 which later become, respectively, the lower portion of the location member, the outflow member, the threshold member, and the upper portion of the location member. FIG. 4 shows the precursor after the end portions 10 and 13 have been bent at right angles. The bending is carried out while the polymeric material in lines 51 and 52 is still soft, and the polymeric material then cools and hardens while the precursor is in the configuration shown. The precursor shown in FIG. 4 is then deformed elastically as shown generally by the broken line in FIG. 4, and the portion 13 is melt-bonded to the portion 10 along lines 41 and 42 to form location member 4. The apex of the loop thus formed is heat-treated and pinched to provide an SCD as shown in side view in FIG. 5. FIG. 6 is an enlarged view of part of the base of FIG. 5.

Figure 5:
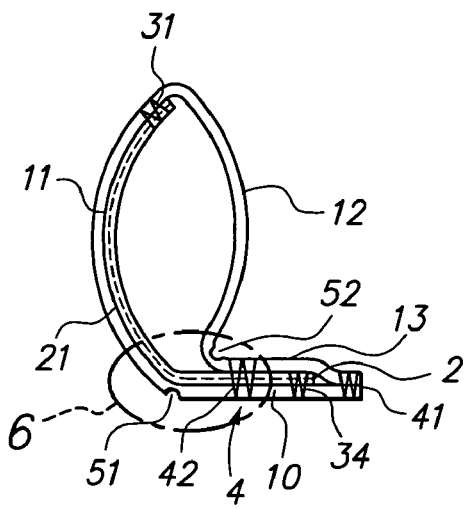
Figure 6:
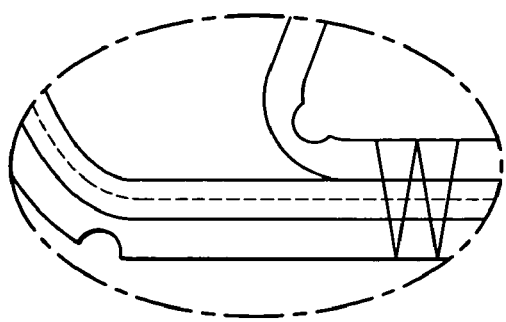
FIG. 6 is an enlarged view of part of FIG. 5.
Figure 7:
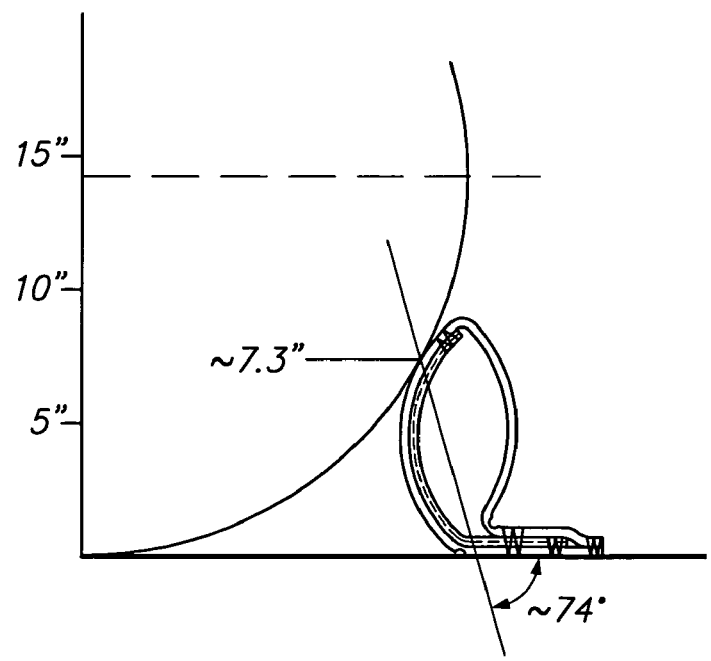
FIG. 7 shows the dimensions designated in the second aspect of the invention for an SCD as shown in FIG. 5.

FIG. 7 shows the dimensions referred to in the second aspect of the invention when a disk of 28 inch diameter first contacts the outflow member of an SCD as shown in FIG. 5.

Figure 8:
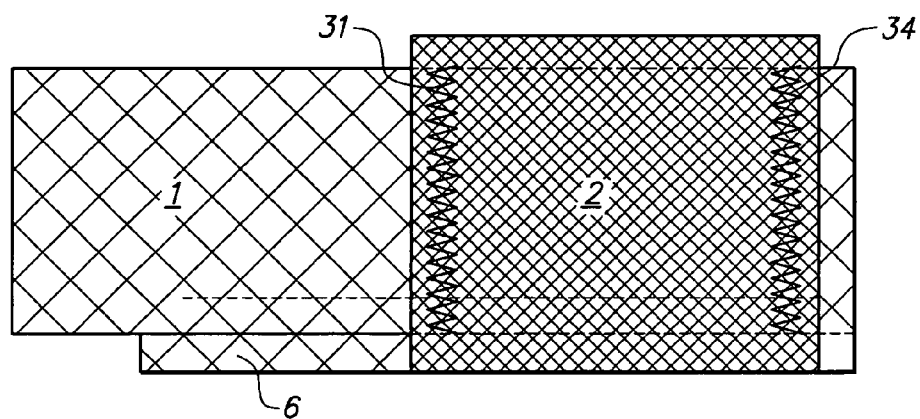
FIGS. 8-11 shows successive stages in the production of another SCD of the invention.

FIG. 8 is a top view of a precursor for an SCD. Polymeric filter material 2 having small apertures is melt-bonded to the top surface of polymeric netting material 1 along lines 31 and 34. A strip 6 of the same polymeric netting material is melt-bonded along one edge of the bottom surface of the netting material 1. The precursor is folded in half, with the filter material on the inside and the overlapping ends of the netting material 1 are melt-bonded together. A heated metal bar is then impressed into the netting material at two different locations, and while the polymeric material heated by the metal bar is still soft, the precursor is bent into the configuration shown in FIGS. 9 and 10, which are cross-sections at the center and the end of the SCD respectively, and which show the indentations made by the metal bar at locations 51 and 52.

Figure 9:
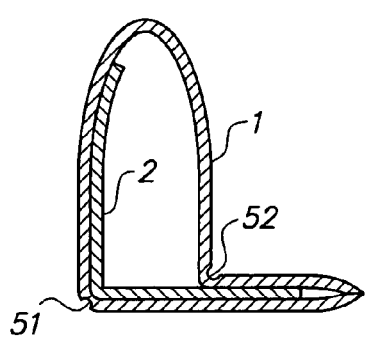
Figure 10:
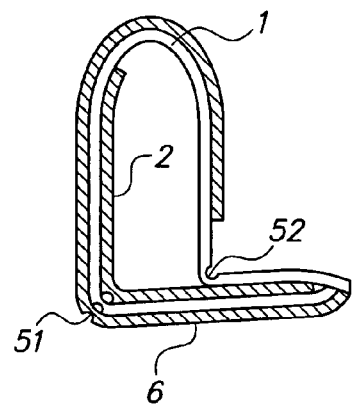
Figure 11:
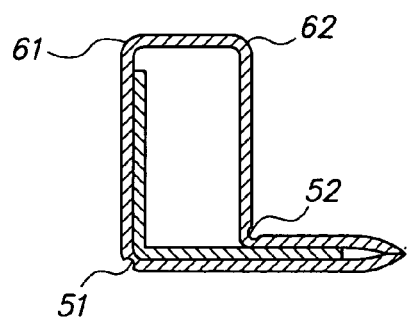

The product shown in FIGS. 9 and 10 can be used as an SCD. An SCD having a generally rectangular SCC as shown in FIG. 11 can be obtained by (a) bending the upright member shown in FIGS. 9 and 10 flat in the direction away from the location member and passing the apex of the upright member through a pair of unheated rollers, thus producing a permanent longitudinal crease 61, and (b) bending the upright member flat in the opposite direction and passing the apex of the upright member through a pair of unheated rollers, thus producing a second longitudinal crease 62.

The invention claimed is:

1. A sediment control device (SCD) comprising
 1) an elongate threshold member having a multiplicity of relatively large threshold apertures therethrough;
 2) an elongate outflow member having a multiplicity of relatively large outflow apertures therethrough;
 3) an elongate filter which has a multiplicity of relatively small filter apertures therethrough, and
 4) a location member;
the threshold member, outflow member, filter and location member being secured together so that, when the location member is placed on a horizontal substrate,
 (a) an upright member comprising the threshold member, the filter and the outflow member extends upwards from the substrate, and
 (b) liquid flowing over the location member towards the upright member passes through the threshold member, the filter and the outflow member;
the upright member including an elongate sediment collection chamber (SCC) between the threshold member and the outflow member, the SCC having (i) a cross-section whose height is p times its maximum width, where p is at least 1.5, and (ii) an unobstructed volume which is at least 5% of the total volume of the SCD.

2. An SCD according to claim 1 wherein the height of the SCC is at least 4 inches and p is at least 4.

3. An SCD according to claim 1 wherein the height of the SCC is 7-10 inches and p is 4-15.

4. An SCD according to claim 1 wherein the shape of the outflow member is such that, if (i) the location member is placed on a horizontal substrate, (ii) the upright member is, position so that its highest point is vertically above the point at which the outflow member contacts the substrate, and (iii) a vertical disk having an outer diameter of 28 inches is rolled over the substrate towards the outflow member and at right angles thereto, without passing over the location member,
 (a1) the first point of contact between the disc and the outflow member is at a height of at least 5 in. above the substrate, and
 (a2) the angle between (i) the horizontal and (ii) a line joining said first point of contact and the closest point of contact between the outflow member and the substrate, is at least 65°.

5. An SCD according to claim 4 wherein the shape of the threshold member is such that, if (i) the location member is placed on a horizontal substrate, (ii) the upright member is, positioned so that its highest point is vertically above the point at which the outflow member contacts the substrate, and (iii) a vertical disk having an outer diameter of 28 inches is rolled over the location member towards the threshold member and at right angles thereto,
 (b1) the first point of contact between the disc and the threshold member is at a height of at least 5 in., and
 (b2) the angle between (i) the horizontal and (ii) a line joining said first point of contact and the closest point of contact between the threshold member and the location member, is at least 65°.

6. An SCD according to claim 5 wherein the first point of contact between the disk and the outflow member is at a height of 5-12 inches above the substrate, and the first point of contact between the disk and the threshold member is at a height of 5-12 inches above the substrate.

7. An SCD according to claim 6 wherein the response line is a bending line in which the minimum thickness is at most 0.8 times the thickness of the adjacent portion of the member.

8. An SCD according to claim 7 wherein the bending line has a width of 0.12 to 0.35 inch.

9. An SCD according to claim 1 wherein one or both of the outflow member and the threshold member includes an elongate response line which is either more or less responsive to bending forces than the areas adjacent to the response line.

10. An SCD according to claim 1 wherein the base of the threshold member has a reentrant cross-section formed by (i) a first portion which extends upwards away from the location member, (ii) a second portion which extends over the location member, and (iii) a reentrant angle between the first and second portions.

11. A method of controlling sediment which comprises passing a sediment-containing liquid through an SCD as defined in claim 1.

12. A method of making an SCD as defined in claim 1, the method comprising
 (A) providing a precursor which comprises an apertured polymeric sheet material which
  (i) has relatively large apertures therethrough,
  (ii) has first and second surfaces, and
  (iii) has a first configuration;
 (B) heating a selected area of the sheet so that polymeric material in the selected area is at a temperature above its softening point;
 (C) while the polymeric material in the selected area is above its softening point, bending the selected area so that the precursor has a second configuration;
 (D) allowing the heated polymeric material to cool while the precursor is in a third configuration, the third configuration being different from the first configuration and being the same as or different from the second configuration;
 (E) after step (D), bending the precursor so that it undergoes elastic deformation into a fourth configuration in which selected parts of the precursor are in contact with each other; and
 (F) securing the selected parts to each other.

13. A precursor for an SCD as defined in claim 1 which comprises
 (a) an apertured polymeric sheet which
  (i) has relatively large apertures therethrough, and
  (ii) has first and second surfaces; and
 (b) a sheet of filter material secured to the first surface of the apertured polymeric sheet;
the apertured polymeric sheet including a response line which is either more or less responsive to bending forces than the areas adjacent to the response line.

14. A sediment control device (SCD) comprising
 1) an elongate threshold member having a multiplicity of threshold apertures therethrough, each of the threshold apertures having an area of 0.01 to 1.0 in.$^2$;
 2) an elongate outflow member having a multiplicity of relatively large outflow apertures therethrough, each of the outflow apertures having an area of 0.01 to 1.0 in.$^2$;
 3) an elongate outflow filter which has a multiplicity of relatively small filter apertures therethrough, and which is supported by the outflow member, and
 4) a location member;
the threshold member, outflow member, outflow filter and location member being secured together so that, when the location member is placed on a horizontal substrate,
 (a) an upright member comprising the threshold member, the outflow filter and the outflow member extends upwards from the substrate, and
 (b) liquid flowing over the location member towards the upright member passes through the threshold member, the filter and the outflow member;
the upright member including an elongate sediment collection chamber (SCC) between the threshold member and the outflow member, the SCC having (i) a cross-section whose height is at least 7 inches and whose height is p times its maximum width, where p is at least 4, and (ii) an unobstructed volume which is at least 10% of the total volume of the SCD.

15. An SCD according to claim 14 wherein the cross-section of the SCC has a height of 7-10 inches and p is 7-14.

16. An SCD according to claim 14 wherein the shape of the outflow member is such that, if (i) the location member is placed on a horizontal substrate, (ii) the upright member is position so that its highest point is vertically above the point at which the outflow member contacts the substrate, and (iii) a vertical disk having an outer diameter of 28 inches is rolled over the substrate towards the outflow member and at right angles thereto, without passing over the location member,
 (a1) the first point of contact between the disk and the outflow member is at a height 5-12 inch above the substrate, and
 (a2) the angle between (i) the horizontal and (ii) a line joining said first point of contact and the closest point of contact between the outflow member and the substrate, is at least 70°.

17. An SCD according to claim 14 wherein the shape of the threshold member is such that, if (i) the location member is placed on a horizontal substrate, (ii) the upright member is position so that its highest point is vertically above the point at which the outflow member contacts the substrate, and (iii) a vertical disk having an outer diameter of 28 inches is rolled over the location member towards the threshold member and at right angles thereto,
 (b1) the first point of contact between the disk and the threshold member is at a height 6-12 inch above the location member, and
 (b2) the angle between (i) the horizontal and (ii) a line joining said first point of contact and the closest point of contact between the threshold member and the location member, is at least 70°.

18. An SCD according to claim 14 wherein one or both of the outflow member and the threshold member includes an elongate bending line which is more responsive to bending forces than the areas adjacent to the ending line, in which the minimum thickness is at most at most 0.6 times, the thickness of the adjacent portion of the member, and which has a width of 0.12 to 0.35 inch.

19. An SCD according to claim 14 wherein the base of the threshold member has a reentrant cross-section formed by (i) a first portion which extends upwards away from the location member, (ii) a second portion which extends over the location member, and (iii) a reentrant angle between the first and second portions.

20. A sediment control device (SCD) comprising
 1) an elongate threshold member having a multiplicity of relatively large threshold apertures therethrough;
 2) an elongate outflow member having a multiplicity of relatively large outflow apertures therethrough;

3) an elongate filter which has a multiplicity of relatively small filter apertures therethrough, and 4) a location member;

the threshold, outflow and location members being secured together so that, when the location member is placed on a horizontal substrate, (a) an upright member comprising the threshold member, the outflow filter and the outflow member extends upwards from the substrate, and (b) liquid flowing over the location member towards the upright member passes through the threshold member, the filter and the outflow member;

the SCD having one or both of the following characteristics (a) the shape of the outflow member is such that, if (i) the location member is placed on a horizontal substrate, (ii) the upright member is, if necessary, bent so its highest point is vertically above the point at which the outflow member contacts the substrate, and (iii) a vertical disk having an outer diameter of 28 inches is rolled over the substrate towards the outflow member and at right angles thereto, without passing over the location member, (a1) the first point of contact between the disk and the outflow member is at a height of at least 5 in. above the substrate, and (a2) the angle between (i) the horizontal and (ii) a line joining said first point of contact and the closest point of contact between the outflow member and the substrate, is at least 70°; and (b) the shape of the threshold member is such that, if (i) the location member is placed on a horizontal substrate, (ii) the upright member is position so that its highest point is vertically above the point at which the outflow member contacts the substrate, and (iii) a vertical disk having an outer diameter of 28 inches is rolled over the location member towards the threshold member and at right angles thereto, (b1) the first point of contact between the disk and the threshold member is at a height of at least 5 in. above the location member, and (b2) the angle between (i) the horizontal and (ii) a line joining said first point of contact and the closest point of contact between the threshold member and the location member, is at least 70°.

* * * * *